United States Patent
Hino

(10) Patent No.: US 9,338,837 B2
(45) Date of Patent: May 10, 2016

(54) LIGHTING DEVICE

(71) Applicant: Toshiba Lighting & Technology Corporation, Yokosuka-shi, Kanagawa-ken (JP)

(72) Inventor: Kiyokazu Hino, Yokosuka (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 0 days.

(21) Appl. No.: 14/207,702

(22) Filed: Mar. 13, 2014

(65) Prior Publication Data
US 2015/0061535 A1    Mar. 5, 2015

(30) Foreign Application Priority Data
Sep. 4, 2013  (JP) .................. 2013-182929

(51) Int. Cl.
*B60Q 1/14* (2006.01)
*H05B 33/08* (2006.01)
*F21S 8/10* (2006.01)

(52) U.S. Cl.
CPC .............. *H05B 33/0806* (2013.01); *B60Q 1/14* (2013.01); *H05B 33/0803* (2013.01); *H05B 33/0845* (2013.01); *F21S 48/215* (2013.01)

(58) Field of Classification Search
CPC .............. B60Q 1/02; B60Q 1/14; B60Q 1/26; H05B 33/08
USPC ........................ 315/77, 82, 224, 291, 294, 362
See application file for complete search history.

(56) References Cited

U.S. PATENT DOCUMENTS

| | | | |
|---|---|---|---|
| 2005/0266589 A1* | 12/2005 | Furuse et al. .................. 438/21 |
| 2007/0120507 A1* | 5/2007 | Uchida et al. ................. 315/360 |
| 2008/0080200 A1* | 4/2008 | Robbins et al. ............... 362/487 |
| 2011/0062870 A1* | 3/2011 | Kanbara ........... H02M 3/33507 315/77 |
| 2011/0260617 A1* | 10/2011 | Tanaka ............... H05B 33/0842 315/82 |
| 2012/0086336 A1* | 4/2012 | Tanaka ........................... 315/82 |
| 2013/0320850 A1* | 12/2013 | Nakamura .......... F21S 48/1747 315/82 |

FOREIGN PATENT DOCUMENTS

JP    3107038 U    1/2005

OTHER PUBLICATIONS

Aug. 20, 2014—(EP) Extended Search Report—App 14158955.6.
Ngineering: "LED Circuits", Google Scholar, 2008, XP002728240, Retrieved from the Internet: URL:http://www.ngineering.com/led_circuits.htm [retrieved on Aug. 6, 2014], 5 pages.

* cited by examiner

*Primary Examiner* — Tung X Le
(74) *Attorney, Agent, or Firm* — Banner & Witcoff, Ltd.

(57) ABSTRACT

According to one embodiment, there is provided a lighting device which includes a substrate; a light emitting element which is provided on the substrate; and a resistive element which is provided on the substrate, and is connected to the light emitting element in series. A voltage rate of the resistive element when a value of a first voltage which is reduced to half is applied to a first circuit to which the light emitting element and the resistive element are connected in series becomes equal to or smaller than 25% of a voltage rate of the resistive element when the first voltage is applied to the first circuit.

18 Claims, 3 Drawing Sheets

LIGHTING DEVICE

CROSS-REFERENCE TO RELATED APPLICATIONS

This application is based upon and claims the benefit of priority from Japanese Patent Application No. 2013-182929, filed on Sep. 4, 2013; the entire contents of which are incorporated herein by reference.

FIELD

Embodiments described herein relate generally to a lighting device.

BACKGROUND

In recent years, a lighting device for vehicle (for example, lighting device for automobile) in which a light emitting diode (LED) instead of an incandescent light bulb (filament light bulb) is used as a light source is put to practical use.

Since the lighting device in which the light emitting diode is used as the light source has a long life, and can reduce power consumption, it is possible to expect the lighting device in which the light emitting diode is used to replace the incandescent light bulb.

Here, the lighting device for vehicle uses a battery as a power source, however, a voltage which is applied to the lighting device fluctuates.

For example, a standard operating voltage (rated voltage) of a general lighting device for vehicle is approximately 13.5 V, however, due to a decrease in voltage in a battery, an operation of an alternator, an influence on a circuit, or the like, a voltage which is applied to a lighting device fluctuates.

For this reason, in a lighting device for vehicle, an operating voltage range (voltage fluctuation range) is determined. For example, the operating voltage range is from 9 V to 16 V in general, and is from 7 V to 16 V in some cases.

When an applied voltage decreases, an amount of light emission decreases even in a case of an incandescent light bulb, or even in a case of a lighting device in which the light emitting diode is used as a light source.

However, when a voltage largely decreases (becomes low voltage), there is a problem in that the amount of light emission of a lighting device in which the light emitting diode is used as a light source becomes smaller than that of the incandescent light bulb.

In this case, it is possible to suppress a decrease in the amount of light emission of the lighting device in which the light emitting diode is used as the light source using a constant voltage element, or the like.

However, when using the constant voltage element, or the like, there is a problem in that the constant voltage element, or the like, is newly necessary, a calorific value becomes large due to a decrease in circuit efficiency (ratio of applied voltage to light emitting diode with respect to input voltage), or a size of a substrate becomes large.

For this reason, there is a concern that minimization, or cost reduction which is desired in a lighting device for vehicle, may be not obtained.

DETAILED DESCRIPTION

Figure 1:
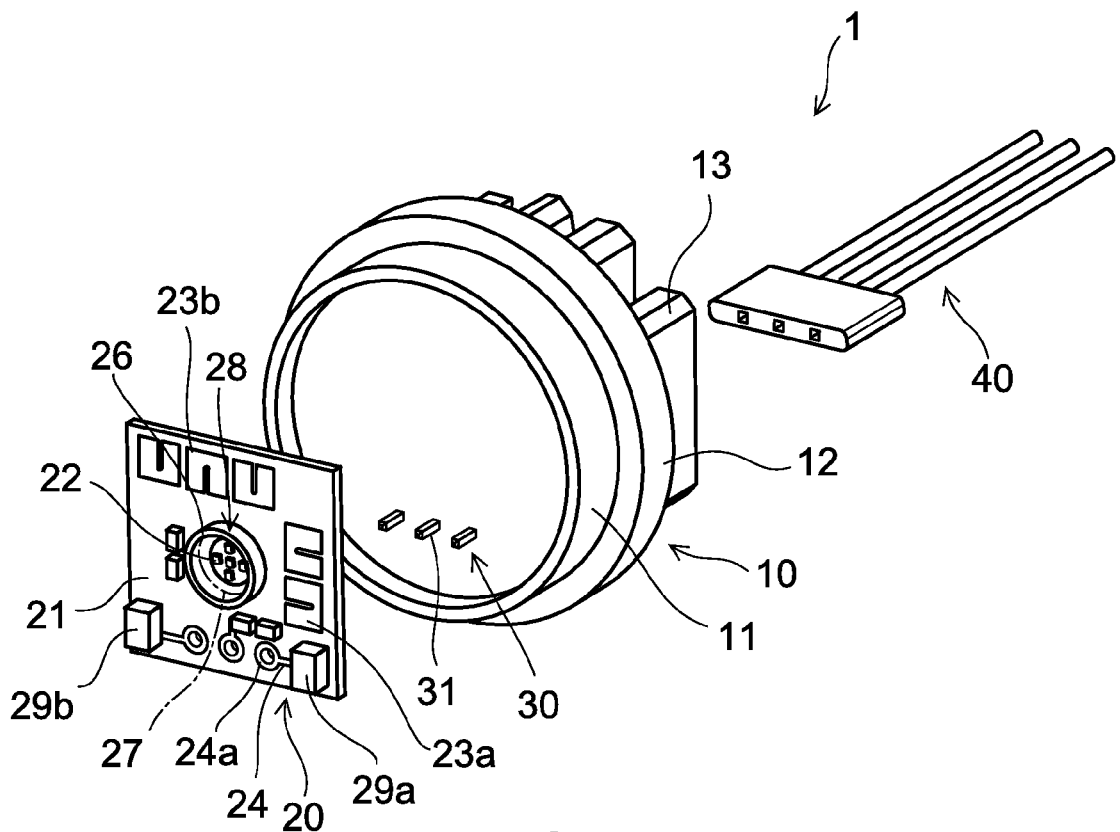
FIG. 1 is a schematic perspective view which exemplifies a lighting device according to an embodiment.

In general, according to one embodiment, there is provided a lighting device which includes a substrate; a light emitting element which is provided on the substrate; and a resistive element which is provided on the substrate, and is connected to the light emitting element in series.

In addition, a voltage rate of the resistive element when a value of a first voltage which is reduced to half is applied to a first circuit to which the light emitting element and the resistive element are connected in series becomes equal to or smaller than 25% of a voltage rate of the resistive element when the first voltage is applied to the first circuit. According to the lighting device, it is possible to suppress a reduction in amount of light emission even when there is a voltage drop.

In this case, it is possible to obtain an amount of light emission equal to or greater than that of the incandescent light bulb, in a region in which an input voltage is low (when voltage drops).

In the device, a plurality of the resistive elements may be provided, and respective resistance values of the plurality of resistive elements may be approximately the same.

According to the lighting device, it is possible to remove a resistive element of which a temperature largely rises. For this reason, it is possible to further suppress the reduction in the amount of light emission even when there is a voltage drop.

In the device, the resistive element may have a film shape.

According to the lighting device, it is possible to improve a heat radiating property of the resistive element. For this reason, it is possible to further suppress the reduction in the amount of light emission even when there is a voltage drop.

In the device, a second circuit may be further included in which the light emitting element and the resistive element are connected in series.

In the device, the first circuit may be a circuit for a stop lamp, and the second circuit may be a circuit for a tail lamp.

In the device, a voltage rate of a resistive element of the second circuit when a value of the first voltage which is reduced to half is applied to the second circuit may be set to be higher than a voltage rate of a resistive element of the first circuit when the value of the first voltage which is reduced to half is applied to the first circuit.

According to the lighting device, it is possible to make a difference between brightness of the tail lamp and brightness of the stop lamp large, when a voltage fluctuates.

In the device, the substrate includes a wiring pattern on a surface thereof.

The light emitting element and the resistive element may be connected to the wiring pattern.

In the device, the resistive element may include ruthenium oxide.

In the device, the resistive element may be a membrane pressure resistive element.

In the device, the resistive element may include a removal unit corresponding to a resistance value of the resistive element.

In the device, respective resistance values of the plurality of resistive elements may be set to be approximately the same due to the removal unit which is respectively provided in the plurality of resistive elements.

The device may further include a control element which is provided on the substrate, and is connected to the light emitting element in series.

In the device, the control element may be a diode.

The device may further include a capacitor which is provided on the substrate, and is connected to the light emitting element in parallel.

In the device, the substrate may be formed of any one of a ceramic, a high heat conductivity resin, and a metal plate of which a surface is coated with an insulating material.

The device may further include a surrounding wall member which surrounds the light emitting element.

In the device, the surrounding wall member may have a circular shape, and may be formed of a material with high reflectance with respect to light which is radiated from the light emitting element.

The device may further include a sealing unit with translucency which covers the light emitting element.

In the device, the sealing unit may include a fluorescent substance.

The sealing unit may be provided in the surrounding wall member which surrounds the light emitting element.

Hereinafter, embodiments will be exemplified with reference to drawings. In addition, in each figure, the same constituent elements will be given the same reference numerals, and detailed descriptions will be appropriately omitted.

In addition, a lighting device 1 which is exemplified in below can be used as a lighting device for vehicle such as an automobile.

FIG. 1 is a schematic perspective view for exemplifying a lighting device 1 according to an embodiment.

Figure 2:
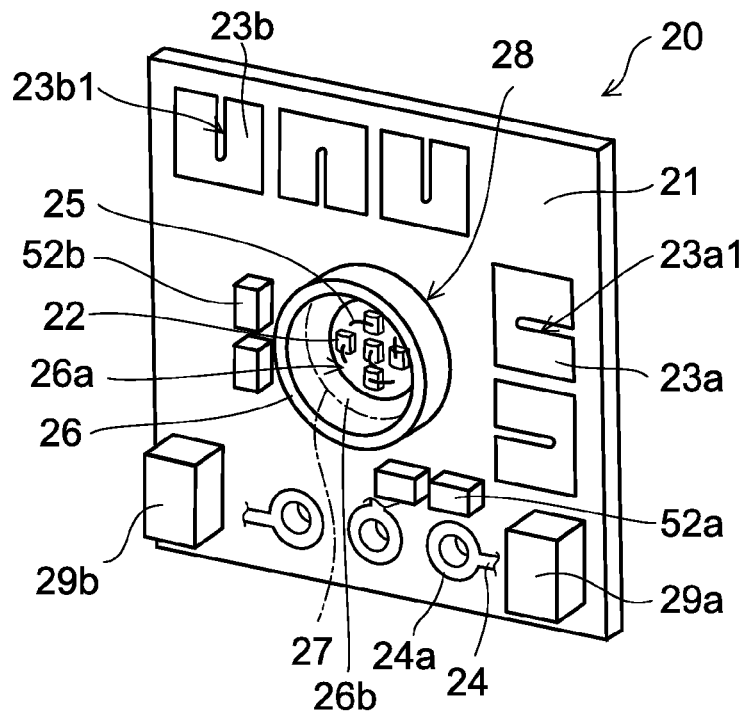
FIG. 2 is a schematic perspective view of a light emitting unit.

FIG. 2 is a schematic perspective view of a light emitting unit 20.

Figure 3:
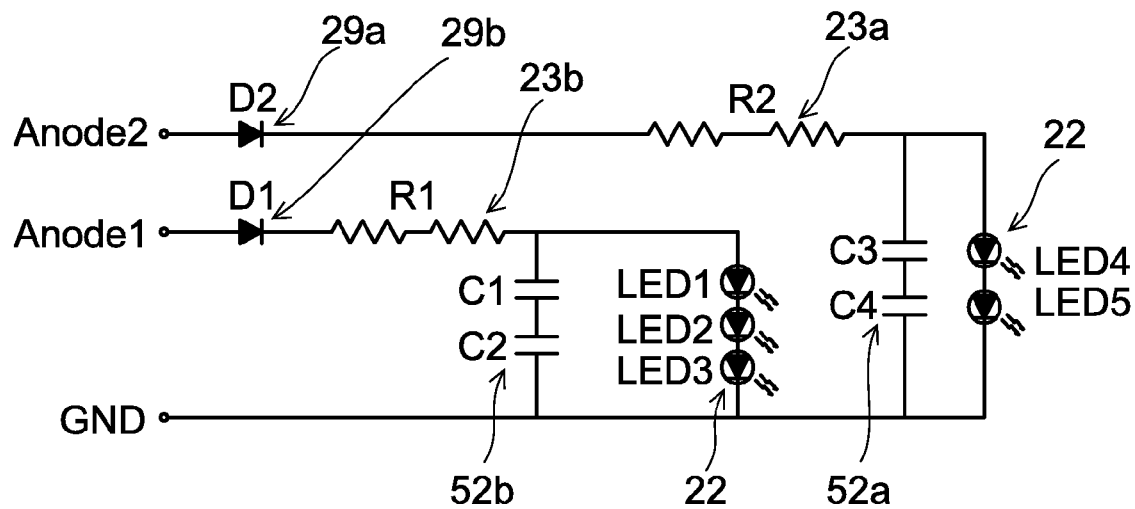
FIG. 3 is a circuit diagram of the light emitting unit.

FIG. 3 is a circuit diagram of the light emitting unit 20.

As illustrated in FIG. 1, the lighting device 1 is provided with a main body unit 10, the light emitting unit 20, an electric power supply unit 30, and a socket 40.

The main unit 10 is provided with a storage unit 11, a flange unit 12, and a fin 13.

The storage unit 11 has a cylindrical shape, and protrudes from one surface of the flange unit 12. A light emitting unit 20 is accommodated inside the storage unit 11. In addition, an electric power supply terminal 31 of the electric power supply unit 30 protrudes into the storage unit 11.

The flange unit 12 has a circular plate shape, is provided with the storage unit 11 on one surface thereof, and is provided with the fin 13 on the other surface.

A plurality of the fins 13 are provided by being protruded from a surface of the flange unit 12. The plurality of fins 13 have plate shapes, and function as radiating fins.

The main body unit 10 has a function of accommodating the light emitting unit 20, the electric power supply unit 30, or the like, and has a function of radiating heat which is generated in the light emitting unit 20 or the electric power supply unit 30 to the outside of the lighting device 1.

For this reason, it is possible to form the main body unit 10 using a material having high thermal conductivity, in consideration of heat radiating to the outside. For example, the main body unit 10 can be formed using aluminum, an aluminum alloy, a highly heat conductive resin, or the like. The high heat conductive resin is a resin in which fibers or particles of carbon or aluminum oxide with high heat conductivity are mixed to a resin such as polyethylene terephthalate (PET), nylon, or the like.

In this case, it is possible to form a portion which radiates heat to the outside, such as the fin 13, using a high heat conductive material, and to form portions excluding the fin using a resin, or the like.

In addition, when a main portion of the main body unit 10 is formed using a conductive material, the periphery of the electric power supply terminal 31 may be covered with an insulating material (not shown), and the main body unit 10 which is formed of a conductive material may be arranged at the periphery of the electric power supply terminal 31 in order to secure electrical insulation between the electric power supply terminal 31 and the main body unit 10 which is formed of the conductive material. As the insulating material, it is preferable to use a resin, or the like, and a material with high heat conductivity, for example.

In addition, an attaching unit (not shown) for being attached to, or detached from a lighting tool for a vehicle may be provided in the main body unit 10.

As illustrated in FIG. 2, the light emitting unit 20 is provided with a substrate 21, a light emitting element 22, resistive elements 23a and 23b, a wiring pattern 24, wiring 25, a surrounding wall member 26, a sealing unit 27, a bonding unit 28, control elements 29a and 29b, and control elements 52a and 52b.

The substrate 21 is provided inside the storage unit 11 of the main body unit 10.

The substrate 21 has a plate shape, and is provided with the wiring pattern 24 on the surface thereof.

The substrate 21 can be formed using an inorganic material (ceramic) such as aluminum oxide, aluminum nitride, for example, and an organic material such as paper phenol, or glass epoxy. In addition, the substrate 21 may be a substrate which is formed by coating the surface of a metal plate using an insulating material. In addition, when the surface of the metal plate is coated with an insulating material, the insulating material may be formed of an organic material, or may be formed of an inorganic material.

In addition, the substrate 21 may be a single layer, or may be a multilayer.

Here, the resistive elements 23a and 23b generate heat when voltages are applied, and temperatures thereof rise.

In addition, as described below, when heat radiation of the resistive elements 23a and 23b is not good, the amount of light emission of the lighting device 1 (light emitting element 22) is largely reduced along with a voltage drop.

For this reason, it is preferable that a material of the substrate 21 be a high heat conductive material.

As the high heat conductive material, there are, for example, a ceramic such as aluminum oxide or aluminum nitride, a high heat conductive resin, a metal plate of which the surface is coated with an insulating material, and the like.

A plurality of the light emitting elements 22 are provided on the wiring pattern 24 which is provided on the surface of the substrate 21.

The light emitting element 22 can be made as an element in which an electrode which is not shown is included on a surface (top face) on a side opposite to a side on which the light emitting element is provided in the wiring pattern 24. In addition, the electrode which is not shown may be provided on the surface (lower surface) on a side on which the light emitting element is provided in the wiring pattern 24, and on the surface (top face) on the side which is opposite to the side on which the light emitting element is provided in the wiring pattern 24, or may be provided on any one of the surfaces.

The electrode which is not shown, and is provided on the lower surface of the light emitting element 22 is electrically connected to a mounting pad which is provided in the wiring pattern 24 through a conductive thermosetting material such as silver paste. The electrode which is not shown, and is provided on the top face of the light emitting element 22 is electrically connected to a wiring pad which is provided in the wiring pattern 24 through the wiring 25.

The light emitting element 22 can be formed using, for example, a light emitting diode, an organic light emitting diode, a laser diode, or the like.

The top face as a light emitting surface of light of the light emitting element 22 faces the front side of the lighting device 1, and mainly radiates light toward the front surface side of the lighting device 1.

The number of the light emitting elements 22, or a size thereof is not limited to the example, and can be appropriately changed according to the size, the use, or the like, of the lighting device 1.

The wiring pattern 24 is provided at least one surface of the substrate 21.

It is also possible to provide the wiring pattern 24 on both surfaces of the substrate 21. However, it is preferable to provide the wiring pattern 24 on one surface of the substrate 21 in order to reduce manufacturing cost.

An input terminal 24a is provided in the wiring pattern 24.

A plurality of the input terminals 24a is provided. The electric power supply terminal 31 of the electric power supply unit 30 is electrically connected to the input terminals 24a. For this reason, the light emitting element 22 is electrically connected to the electric power supply unit 30 through the wiring pattern 24.

The wiring 25 electrically connects an electrode which is not shown, and is provided on the top face of the light emitting element 22 and the wiring pad which is provided in the wiring pattern 24.

The wiring 25 can be formed using, for example, a wire which is mainly made of gold. However, a material of the wiring 25 is not limited to the wire which is mainly made of gold, and, for example, may be a wire which is mainly made of copper, or a wire which is mainly made of aluminum.

The wiring 25 is electrically connected to the electrode which is not shown, and is provided on the top face of the light emitting element 22 and the wiring pad which is provided in the wiring pattern 24 using ultrasonic welding, or thermal welding, for example. The wiring 25 can be electrically connected to the electrode which is now shown, and is provided on the top face of the light emitting element 22 and the wiring pad which is provided in the wiring pattern 24 using a wire bonding method, for example.

The surrounding wall member 26 is provided on the substrate 21 so as to surround the plurality of light emitting elements 22. The surrounding wall member 26 has, for example, an annular shape, and the plurality of light emitting elements 22 are arranged at a center portion 26a.

The surrounding wall member 26 can be formed using, for example, a resin such as polybutylene terephthalate (PBT) or polycarbonate (PC), a ceramic, or the like.

In addition, when a resin is used as a material of the surrounding wall member 26, it is possible to improve reflectivity with respect to light which is radiated from the light emitting element 22 by mixing particles such as titanium oxide.

In addition, particles which are formed of a material having high reflectivity with respect to light which is radiated from the light emitting element 22 may be mixed, without limiting the material to the particles of titanium oxide.

In addition, it is also possible to form the surrounding wall member 26 using a white resin.

A side wall surface 26b of the surrounding wall member 26 on the center portion 26a side is an inclined plane. Part of light which is radiated from the light emitting element 22 is reflected on the side wall surface 26b of the surrounding wall member 26, and is radiated toward the front surface side of the lighting device 1.

In addition, light which is part of light radiated toward the front surface side of the lighting device 1 from the light emitting element 22, and is totally reflected on the top face (interface between the sealing unit 27 and ambient air) of the sealing unit 27 is reflected on a side wall surface 26b of the surrounding wall member 26 on the center portion 26a side, and is radiated toward the front surface side of the lighting device 1 again.

That is, it is possible to cause the surrounding wall member 26 to also have a function of a reflector. In addition, it is possible to appropriately change a form of the surrounding wall member 26 without being limited to the example.

The sealing unit 27 is provided at the center portion 26a of the surrounding wall member 26. The sealing unit 27 is provided so as to cover the inside of the surrounding wall member 26. That is, the sealing unit 27 is provided inside the surrounding wall member 26, and covers the light emitting element 22, the wiring 25, and the wiring pattern 24 which is arranged at the center portion 26a of the surrounding wall member 26.

The sealing unit 27 is formed of a material having translucency. The sealing unit 27 can be formed using a silicone resin, or the like, for example.

The sealing unit 27 can be formed, for example, by filling a resin in the center portion 26a of the surrounding wall member 26. Filling of the resin can be performed using a quantitative liquid discharge device such as a dispenser, for example.

When the center portion 26a of the surrounding wall member 26 is filled with a resin, it is possible to suppress mechanical contact from the outside with respect to the light emitting element 22, the wiring pattern 24 which is arranged at the center portion 26a of the surrounding wall member 26, the wiring 25, or the like. In addition, it is possible to suppress attaching of moisture, gas, or the like, to the light emitting element 22, the wiring pattern 24 which is arranged at the center portion 26a of the surrounding wall member 26, the wiring 25, and the like. For this reason, it is possible to improve reliability of the lighting device 1.

In addition, it is possible to include a fluorescent substance in the sealing unit 27. It is possible to form the fluorescent substance using, for example, YAG-based phosphor (yttrium-aluminum-garnet-based phosphor).

For example, when the light emitting element 22 is a blue light emitting diode, and the fluorescent substance is the YAG-based phosphor, the YAG-based phosphor is excited by blue light which is radiated from the light emitting element 22, and yellow fluorescence is radiated from the YAG-based phosphor. In addition, when the blue light and yellow light are mixed, white light is radiated from the lighting device 1. In addition, the type of the fluorescent substance, or the type of the light emitting element 22 is not limited to the example, and it is possible to appropriately change the type so that a desired luminous color is obtained according to the use, or the like, of the lighting device 1.

The bonding unit 28 bonds the surrounding wall member 26 and the substrate 21.

The bonding unit 28 has a film shape, and is provided between the surrounding wall member 26 and the substrate 21.

The bonding unit 28 can be formed by curing a silicone-based adhesive, or an epoxy-based adhesive, for example.

As illustrated in FIG. 3, the lighting device 1 is provided with two circuits.

That is, a control element 29b, the resistive element 23b, and the light emitting element 22 are connected between an Anode1 as an input terminal and a ground terminal (GND) in series (corresponding to an example of the first circuit).

In addition, a control element 52b is connected to the light emitting element 22 in parallel. One end of the control element 52b is connected to a cathode side of the control element 29b. The other end of the control element 52b is connected to the ground terminal. In addition, one end of the control element 52b may be connected to the anode side of the control element 29b, and the other end of the control element 52b may be connected to the ground terminal.

A control element 29a, the resistive element 23a, and the light emitting element 22 are connected between an Anode2 as an input terminal and the ground terminal in series (corresponding to an example of the second circuit).

In addition, the control element 52a is connected to the light emitting element 22 in parallel. One end of the control element 52a is connected to the cathode side of the control element 29a. The other end of the control element 52a is connected to the ground terminal. In addition, one end of the control element 52a may be connected to the anode side of the control element 29a, and the other end of the control element 52a may be connected to the ground terminal.

In addition, in these circuits, the ground terminal is shared.

The resistive elements 23a and 23b are provided on the wiring pattern 24.

The resistive elements 23a and 23b control a current which flows in the light emitting element 22.

Since there is irregularity in a forward voltage characteristic of the light emitting element 22, when an applied voltage between the Anode1 (or Anode2) and the ground terminal is set to be constant, irregularity occurs in brightness (light flux, luminance, luminous intensity, illuminance) of the light emitting element 22. For this reason, it is set such that a value of a current which flows in the light emitting element 22 is in a desired range using the resistive elements 23a and 23b, so that the brightness of the light emitting element 22 is in a desired range.

The resistive elements 23a and 23b are resistors. The resistive elements 23a and 23b may be a surface-mounted resistor (chip resistor), a resistor including a lead wire (metal oxide film resistor), a film shaped resistor (membrane pressure resistive element) which is formed using a screen printing method, or the like.

As it will be described later, when heat radiation of the resistive elements 23a and 23b is not good, the amount of light emission in the lighting device 1 (light emitting element 22) is largely reduced along with a voltage drop.

For this reason, it is preferable to adopt resistive elements 23a and 23b of which heat radiating properties are excellent.

For example, it is preferable to adopt a film shaped resistor for in the resistive elements 23a and 23b.

In this case, it is preferable to adopt a film shaped resistor which is formed using Ruthenium oxide for in the resistive elements 23a and 23b.

In addition, it is possible to make a value of a current which flows in the light emitting element 22 be in a desired range by changing resistance values of the resistive elements 23a and 23b.

For example, when the resistive elements 23a and 23b are film shaped resistors, by removing a part of the resistive elements 23a and 23b, and forming removal portions 23a1 and 23b1, it is possible to change respective resistance values. In this case, when a part of the resistive elements 23a and 23b is removed, respective resistance values are increased.

Removing of a part of the resistive elements 23a and 23b is performed, for example, by radiating laser light to the resistive elements 23a and 23b.

In addition, when a plurality of the resistive elements 23a are provided, it is preferable that the respective resistance values be the same as far as possible.

By doing so, it is possible to make the amount of heat generation and a temperature in each of the plurality of resistive elements 23a be the same.

For example, when a resistive element 23a of which a resistance value is low is present in the plurality of resistive elements 23a, the amount of heat generation of the resistive element 23a of which the resistance value is low is increased, and a temperature thereof rises. For this reason, there is a concern that the amount of light emission in the light emitting element 22 in a circuit on the Anode2 side may be largely decreased along with a voltage drop.

When a plurality of the resistive elements 23b are provided, it is preferable that each resistance value thereof be the same as far as possible.

By doing so, it is possible to make the amount of heat generation and a temperature in each of the plurality of resistive elements 23b be the same.

For example, when a resistive element 23b of which a resistance value is low is present in the plurality of resistive elements 23b, the amount of heat generation of the resistive element 23b of which the resistance value is low is increased, and a temperature thereof rises. For this reason, there is a concern that the amount of light emission in the light emitting element 22 in a circuit on the Anode1 side may be largely decreased along with a voltage drop.

The number of the resistive elements 23a and 23b, a size thereof, or the like, is not particularly limited.

However, it is preferable that heat radiating properties of the resistive elements 23a and 23b be high.

Since it is possible to suppress a temperature rise when the heat radiating properties of the resistive elements 23a and 23b are high, it is possible to suppress a reduction in the amount of light emission which is accompanied with the voltage drop.

In order to improve the heat radiating property, for example, it is preferable to increase the respective number of the resistive elements 23a and 23b, make the planar shape (installing area) large, or make the thickness large.

The control elements 29a and 29b are provided on the wiring pattern 24.

The control elements 29a and 29b are provided in order to make a backward voltage not be applied to the light emitting element 22, and to make a pulse noise from the opposite direction not be applied to the light emitting element 22.

The control elements 29a and 29b can be diodes, for example. The control elements 29a and 29b can be formed using, for example, a surface mount diode, a diode with a lead wire, or the like.

The control elements 52a and 52b are provided on the wiring pattern 24.

The control elements 52a and 52b can be capacitors, for example. The control elements 52a and 52b can be formed using, for example, a surface mount capacitor, a capacitor with a lead wire, or the like.

In addition, as an example, the lighting device 1 in which two circuits are provided is exemplified. However, it is possible to appropriately change the number of circuits without being limited to two circuits.

Subsequently, a reduction in the amount of light emission will be further described.

Figure 4:
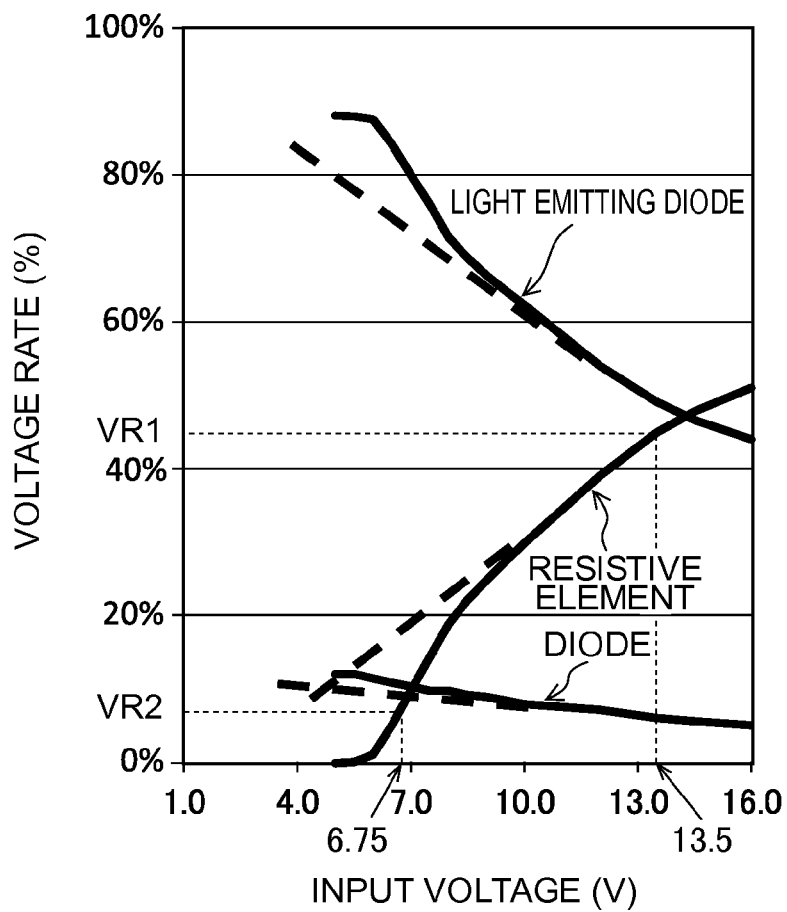
FIG. 4 is a diagram of a graph which exemplifies a relationship between an input voltage and a voltage rate in a circuit in which a diode (control element), a resistive element, and a light emitting diode (light emitting element) are connected in series.

FIG. 4 is a diagram which illustrates a graph for exemplifying a relationship between an input voltage and a voltage rate in a circuit in which the diodes (control elements 29a and 29b), the resistive element (resistive elements 23a and 23b), and the light emitting diode (light emitting element 22) are connected in series.

Here, the input voltage is a voltage which is applied to all of the diode, the resistive element, and the light emitting diode. A voltage rate of the diode, the resistive element, or the light emitting diode is defined by a rate in which a voltage which is applied to each of the diode, resistive element, and the light emitting diode is divided by the input voltage.

In addition, a dashed line in FIG. 4 is a case in which a unit for suppressing the voltage rate of the resistive element is not provided, and a solid line is a case in which the unit for suppressing the voltage rate of the resistive element is provided.

As illustrated in FIG. 4, when the input voltage rises, the voltage rates of the diode and the light emitting diode drop, and the voltage rate of the resistive element increases.

When the input voltage rises, temperatures of the diode, the resistive element, and the light emitting diode rise.

In this case, in the diode and the light emitting diode, resistance values thereof are reduced along with the temperature rise, since the diode and the light emitting diode are semiconductor devices. For this reason, when the input voltage rises, the respective voltage rates of the diode and the light emitting diode decreases.

On the other hand, since the resistive element is formed of metal such as Ruthenium oxide, the resistance value increases along with a temperature rise. For this reason, when the input voltage rises, the voltage rate of the resistive element increases.

In addition, as seen in FIG. 4, when a unit for suppressing the voltage rate of the resistive element is provided, it is possible to increase the voltage rate of the light emitting diode. When it is possible to increase the voltage rate of the light emitting diode, it is possible to increase the amount of light emission of the light emitting diode. In addition, an effect of increasing the amount of light emission of the light emitting diode by suppressing the voltage rate of the resistive element becomes remarkable in a region in which the input voltage is low (when voltage drops).

In order to suppress the voltage rate of the resistive element, an increase in the resistance value of the resistive element may be suppressed. In order to suppress the increase in the resistance value of the resistive element, a temperature rise of the resistive element may be suppressed by improving a heat radiating property relating to the resistive element.

For example, in the following manner, it is possible to improve the heat radiating property relating to the resistive element.

The resistive elements 23a and 23b are film shaped resistors.

When the plurality of resistive elements 23a (resistive elements 23b) are provided, each resistance value is set to be the same as far as possible.

It is set such that the number of resistive elements 23a (resistive elements 23b) becomes large, the planar shape (installing area) becomes large, or the thickness becomes large.

When the resistance value is changed by removing a part of the resistive element 23a (resistive element 23b), a peak temperature (partial temperature rise) is lowered by performing an L cut, or a serpentine cut.

As a material of the resistive element 23a (resistive element 23b), a material with small amount of heat radiation is used.

The substrate 21 is formed of a material with large heat conductivity.

The main body unit 10 is formed of a material with large heat conductivity.

In addition, according to the knowledge which is obtained by the inventor, it is possible to obtain an amount of light emission equal to or greater than that of the incandescent light bulb in a region in which an input voltage is low (when voltage drops), by setting such that a voltage rate VR2 of a resistive element when being applied with a value reduced by half (for example, 6.75 V) of a rated voltage (corresponding to an example of the first voltage) in an operating voltage range (voltage fluctuating range) becomes equal to or smaller than 25% of (VR2≤0.25×VR1) a voltage rate VR1 of a resistive element when being applied with a rated voltage (for example, 13.5 V), by improving the heat radiating property relating to the resistive element.

Figure 5:
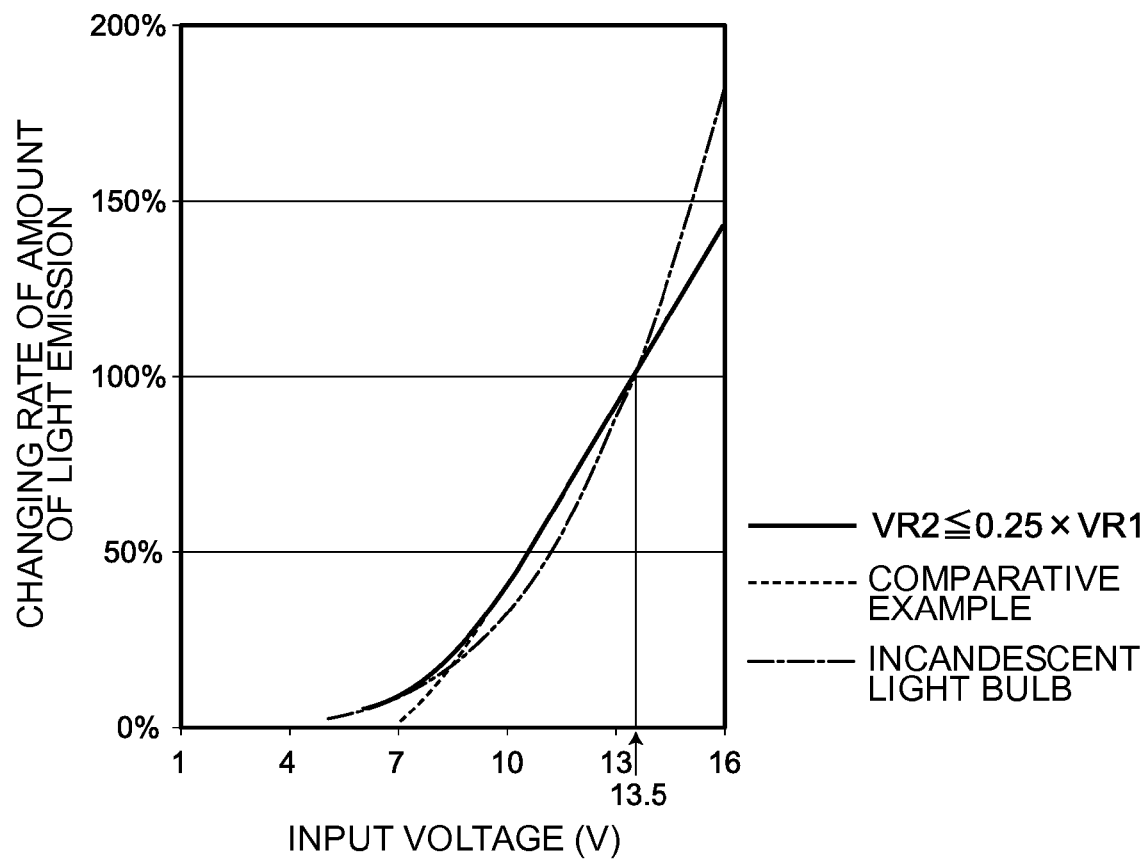
FIG. 5 is a diagram of a graph which exemplifies an effect when $VR2 \leq 0.25 \times VR1$.

FIG. 5 is a diagram which illustrates a graph exemplifying an effect when setting VR2≤0.25×VR1.

In addition, a solid line in FIG. 5 denotes a case of setting VR2≤0.25×VR1, a dashed line denotes a case of a comparative example (a case of not being provided with unit for suppressing voltage rate of resistive element), and a dot dashed line denotes a case of an incandescent light bulb.

As illustrated in FIG. 5, when setting VR2≤0.25×VR1 by improving the heat radiating property relating to the resistive element, it is possible to obtain an amount of light emission equal to or greater than that in the incandescent light bulb.

In addition, in a case of equal to or greater than the rated voltage (for example, 13.5 V), it is possible to make a changing rate of the amount of light emission be small.

This means that it is possible to suppress a change in the amount of light emission even when a voltage fluctuates.

In addition, in the circuit diagram of the light emitting unit 20 which is exemplified in FIG. 3, the circuit on the Anode1 side is set to a stop lamp circuit, and the circuit on the Anode2 side is set to a tail lamp circuit.

In this case, when the amount of light emission largely decreases in the circuit on the Anode1 side which is the stop lamp circuit in a region in which an input voltage is low (when voltage drops), it is difficult for a driver of the following vehicle to recognize lighting of the stop lamp when the stop lamp is turned on (when stepping on brake).

For this reason, a change in the amount of light emission is suppressed by improving the heat radiating property relating to the resistive element 23b in the circuit on the Anode1 side which is the stop lamp circuit.

By doing so, it is possible for the driver of the following vehicle to easily recognize the lighting of the stop lamp even when the voltage fluctuates.

In addition, a change in the amount of light emission is suppressed by improving the heat radiating property relating to the resistive element 23a in the circuit on the Anode2 side which is the tail lamp circuit.

At this time, a reduction in the amount of light emission in the circuit on the Anode2 side is set to be larger than a reduction in the amount of light emission in the circuit on the Anode1 side.

For example, it is set such that the voltage rate of the resistive element 23a when applying the value reduced to half of the rated voltage to the circuit on the Anode2 side becomes larger than that of the resistive element 23b when applying the value reduced to half of the rated voltage to the circuit on the Anode1 side. In this case, it is possible to suppress the voltage rate of the resistive element by controlling the heat radiating property relating to the resistive element.

By doing so, it is possible to make a difference between brightness of the tail lamp and brightness of the stop lamp large when a voltage fluctuates. For this reason, a driver of the following vehicle further easily recognizes lighting of the stop lamp.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A lighting device comprising:
   a substrate;
   a light emitting element provided on the substrate; and
   a resistive element provided on the substrate, and connected to the light emitting element in series, the resistive element controlling a current which flows in the light emitting element,
   wherein a voltage rate of the resistive element when a value of a first voltage which is reduced to half is applied to a first circuit to which the light emitting element and the resistive element are connected in series becomes equal to or smaller than 25% of a voltage rate of the resistive element when the first voltage is applied to the first circuit, and
   a second circuit in which the light emitting element and the resistive element are connected in series,
   wherein a voltage rate of the resistive element of the second circuit when a value of the first voltage which is reduced to half is applied to the second circuit is set to be higher than a voltage rate of the resistive element of the first circuit when the value of the first voltage which is reduced to half is applied to the first circuit.

2. The device according to claim 1,
   wherein a plurality of resistive elements is provided, and
   wherein respective resistance values of the plurality of resistive elements are approximately the same.

3. The device according to claim 2, wherein
   each resistive element includes a removal unit corresponding to a resistance value of the resistance element, and respective resistance values of the plurality of resistive elements are set to be approximately the same due to the removal unit which is respectively provided in the plurality of resistive elements.

4. The device according to claim 1, wherein the resistive element has a film shape.

5. The device according to claim 1, wherein
   the first circuit is a circuit for a stop lamp, and
   the second circuit is a circuit for a tail lamp.

6. The device according to claim 1, wherein
   the substrate includes a wiring pattern on a surface, and
   the light emitting element and the resistive element are connected to the wiring pattern.

7. The device according to claim 1, wherein the resistive element includes ruthenium oxide.

8. The device according to claim 1, wherein the resistive element is a membrane pressure resistive element.

9. The device according to claim 1, wherein the resistive element includes a removal unit corresponding to a resistance value of the resistive element.

10. The device according to claim 1, further comprising:
    a control element provided on the substrate, and connected to the light emitting element in series.

11. The device according to claim 10, wherein the control element is a diode.

12. The device according to claim 1, further comprising:
    a capacitor provided on the substrate, and connected to the light emitting element in parallel.

13. The device according to claim 1, wherein the substrate is any one of a ceramic, a high heat conductivity resin, and a metal plate of which a surface is coated with an insulating material.

14. The device according to claim 1, further comprising:
    a surrounding wall member which surrounds the light emitting element.

15. The device according to claim 14, wherein the surrounding wall member has a circular shape, and is formed of a material with high reflectance with respect to light which is radiated from the light emitting element.

16. The device according to claim 1, further comprising:
    a sealing unit with translucency which covers the light emitting element.

17. The device according to claim 16, wherein the sealing unit includes a fluorescent substance.

18. The device according to claim 16, further comprising:
    a surrounding wall member which surrounds the light emitting element,
    wherein the sealing unit is provided in the surrounding wall.

* * * * *